March 9, 1926.
A. S. CUBITT
1,576,413
LOCKING SCREW AND THE LIKE
Filed May 13, 1925
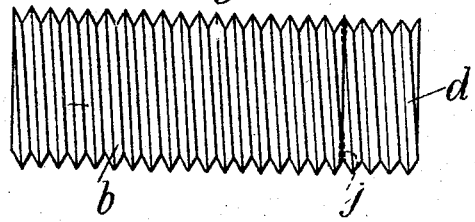
Fig. 1.
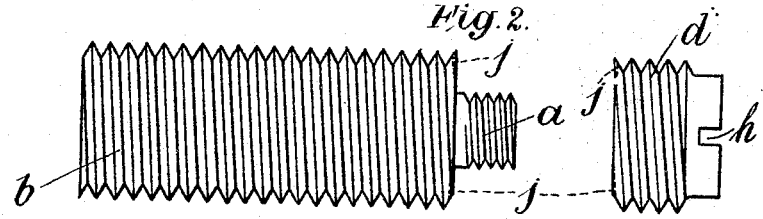
Fig. 2.
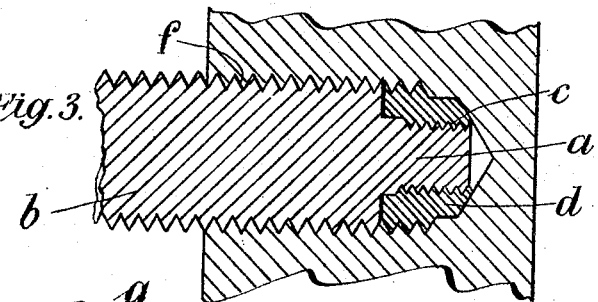
Fig. 3.
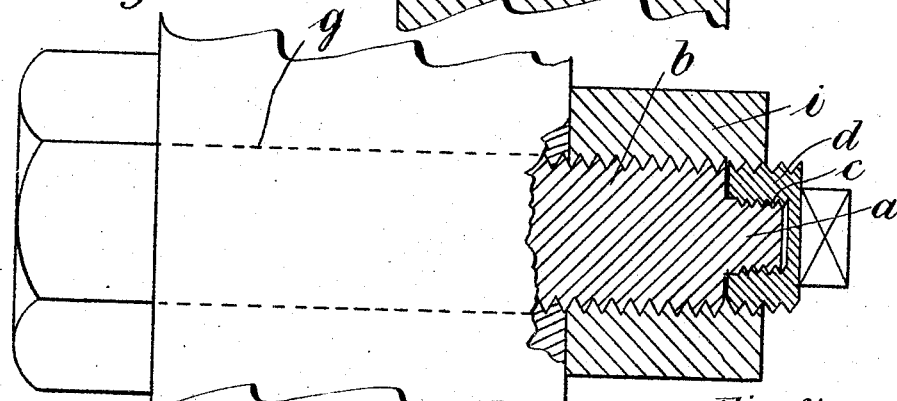
Fig. 4.
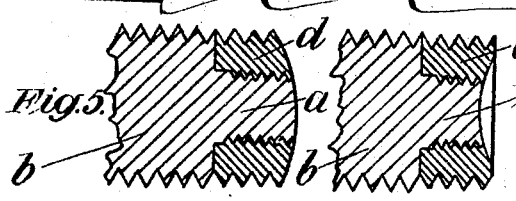
Fig. 5.
Fig. 6.
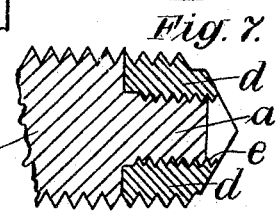
Fig. 7.
INVENTOR:
ARCHIBALD STANNARD CUBITT.
per Fetherstonhaugh & Co.
ATTORNEY.

Patented Mar. 9, 1926.

1,576,413

UNITED STATES PATENT OFFICE.

ARCHIBALD STANNARD CUBITT, OF LONDON, ENGLAND.

LOCKING SCREW AND THE LIKE.

Application filed May 13, 1925. Serial No. 30,097.

*To all whom it may concern:*

Be it known that I, ARCHIBALD STANNARD CUBITT, a subject of the King of Great Britain, residing at London, England, have invented certain new and useful Improvements in and Relating to Locking Screws and the like, of which the following is a specification.

The present invention relates to improvements in and relating to locking screws and the like, and aims to provide a screw-threaded member which is lockable in a screw-threaded hole by a locking action brought about by the means on the member itself.

In a constructional form under the present invention a screw-threaded member comprises two like or similar screw-threaded portions, as regards external diameter and screw thread, united by a screw-in union of different pitch to form normally one continuous screw-threaded member which is lockable in a screw-threaded hole by a relative movement of the portions tending to unscrew these from each other.

The junction plane of the portions must lie within the limits of the screw-threaded hole for the differential screw action to step in to lock the conjoined portions in the screw-threaded hole by a grip lock set up between the threads of the screw and the hole, as when attempt is made to withdraw the screw, as one portion then endeavours to unscrew from the other, or as when a relative movement is imparted to the portions tending to unscrew these from each other.

An article under the present invention may have the external diameter of one or the leading portion of the screw made slightly smaller than the other or main portion.

One of, or both of the junction faces may be raked back or cambered.

The leading portion may be provided with means for holding or rotating it with the aid of a tool.

The accompanying drawings show practical forms of carrying the invention into effect.

In the drawings, Fig. 1 is a view of a bolt or stud in normal position, Fig. 2 is a view with the components separated, Fig. 3 shows the bolt or stud in a locked position in its work, Fig. 4 is a form of screw-nutted bolt attached to its work, Fig. 5 shows a spherical ended bolt, Fig. 6 a concave ended bolt, and Fig. 7 a conical ended bolt.

Referring to the constructional example of a machine screw depicted by Figs. 1 to 3 of the drawings the end portion $a$ of an ordinary machine screw $b$ is turned down to a suitable smaller diameter and screwed with a lesser pitch screw $c$ than the main screw. A collar portion $d$ suitably threaded internally $e$ is screwed on this smaller portion $a$ and the external surface of the collar $d$ is screwed to match the main screw and form a continuation of it.

This compound screw $b$, $d$ can now be easily screwed into a hole $f$ suitably threaded but on attempting to withdraw it the main portion $b$ attempts to unscrew from the collar or locking portion $d$ and the screw-in union being of a different pitch to the main screw effectually locks the combination.

In the construction shown in Fig. 4 provision may be made for imparting a relative movement to the portions tending so as to definitely lock the screw, or the like in its hole, or to lock a nut or the like thereon.

Thus the collar $d$ at its outer end may be notched as at $h$ or cross-passaged for turning by a screwdriver, tommy or the like, or externally or internally machined square, hexagonal, or octagonal, or otherwise appropriately provided with means for co-acting with a spanner, coach-key, or the like, or other tool.

Thus, for example, a nut $i$ may be screwed up tight to a face of the work, and then the collar portion $d$ may be turned the reverse hand to move this relatively to the main portion $b$ to lock the nut $i$. The nut conveniently has the same engagement with the bolt as an ordinary nut, with the addition of, say, two threads to engage the collar portion.

According to the present invention also, the external diameter of the collar portion $d$ may be made slightly smaller than the main portion; this in general, but particularly in the case of a machine screw, stud or the like, so that when the compound screw $b$, $d$ is screwed into a suitably threaded hole, the collar portion $d$ shall advance without such frictional resistance as to cause it to be screwed so tightly on the screw-threaded shouldered down part $a$ of the main screw $b$ as to prevent the main screw $b$ from afterwards attempting to unscrew from the collar portion $d$ when attempt is made to withdraw the main screw.

Or otherwise such reduction of diameter may be employed to facilitate relative movement of the portions tending to unscrew these from each other.

As facilitating the main screw $b$ attempting to unscrew from the collar portion $d$, or facilitating relative movement of the portions tending to unscrew these from each other, the junction faces, or one of these, may be raked back or cambered, as indicated by dotted outline at $j$, so as to reduce the contact diameter and thus reduce the friction tending to lock the parts together.

The difference of pitch between the main screw and the lesser pitch screw union is a measure or determining factor of their relative angular movement required to lock. In an example which gives good results the external portion or main screw is threaded ½". Whitworth having 12 threads per inch and the internal portion or screw union is threaded ⅛" gas thread, this example in practice locking with about three degrees relative angular movement.

In screwing in a machine screw or stud into a blind hole the internal thread of which is generally slightly decreased at the bottom, unless a clearance groove is provided at the blind end, the corresponding end of the collar tends to jam in the bottom of the hole, this jamming facilitating the relative angular movement of the parts taking place when attempt is made to withdraw the screw or stud.

What I claim is:—

1. A locking screw comprising in combination, a main part, an external thread thereon, a shouldered down end, an external thread thereon of like hand but different pitch to said external thread on the main part, a collar part, an external thread thereon of like hand and pitch to the external thread on said main part, and an internal thread in said collar for engaging the external thread on said shouldered down end, the main part and the collar part when united forming one continuous screw threaded bolt of like hand and pitch capable of being locked in a screw-threaded hole by a relative movement between the main part and the collar part tending to unscrew these from each other.

2. A locking screw comprising in combination, a main part having a cambered face, an external thread on said main part, a shouldered down end, an external thread thereon of like hand but different pitch to said external thread on the main part, a collar part, an external thread thereon of like hand and pitch to the external thread on said main part, and an internal thread in said collar for engaging the external thread on said shouldered down end, the main part and the collar part when united forming one continuous screw threaded bolt of like hand and pitch capable of being locked in a screw-threaded hole by a relative movement between the main part and the collar part tending to unscrew these from each other.

3. A locking screw comprising in combination, a main part, an external thread thereon, a shouldered down end, an external thread thereon of like hand but different pitch to said external thread on the main part, a collar part, an external thread thereon of like hand and pitch to the external thread on said main part, and an internal thread in said collar for engaging the external thread on said shouldered down end, the main part and the collar part when united forming one continuous screw threaded bolt of like hand and pitch capable of being locked in a screw-threaded hole by a relative movement between the main part and the collar part tending to unscrew these from each other, and means on said collar for engaging an actuating tool.

In testimony whereof, I affix my signature.

ARCHIBALD STANNARD CUBITT.